(12) United States Patent
Freakes

(10) Patent No.: US 9,988,114 B1
(45) Date of Patent: Jun. 5, 2018

(54) SELF-BALANCING STAND-UP TRANSPORTER-DRIVEN TRAILER

(71) Applicant: Anthony Freakes, Lawrenceville, NJ (US)

(72) Inventor: Anthony Freakes, Lawrenceville, NJ (US)

(*) Notice: Subject to any disclaimer, the term of this patent is extended or adjusted under 35 U.S.C. 154(b) by 0 days. days.

(21) Appl. No.: 15/347,992

(22) Filed: Nov. 10, 2016

Related U.S. Application Data

(60) Provisional application No. 62/253,196, filed on Nov. 10, 2015.

(51) Int. Cl.
*B62D 51/02* (2006.01)
*B62D 63/06* (2006.01)
*B60D 1/52* (2006.01)
*B60D 1/02* (2006.01)
*B60D 1/00* (2006.01)

(52) U.S. Cl.
CPC ............. *B62D 63/062* (2013.01); *B60D 1/02* (2013.01); *B60D 1/52* (2013.01); *B60D 2001/001* (2013.01)

(58) Field of Classification Search
CPC ..... B62D 51/02; B62D 33/0621; B62D 63/06
See application file for complete search history.

(56) References Cited

U.S. PATENT DOCUMENTS 4,708,219 A * 11/1987 Cresswell .............. B62K 5/025
180/11
4,828,282 A * 5/1989 Pinto .................... A01D 34/001
280/32.7
5,064,209 A * 11/1991 Kurschat ................ B62K 5/025
280/204

* cited by examiner

*Primary Examiner* — Bryan A Evans
(74) *Attorney, Agent, or Firm* — Timothy X. Gibson, Esq.; Gibson & Dernier LLP

(57) ABSTRACT

A trailer configured to couple to a self-balancing personal transporter, the trailer including a seat, at least one wheel rotatably coupled to the seat and oriented in an axial direction, the seat configured and positioned to support a user in a seated position with the user's feet in contact with a foot rest of the self-balancing personal transporter, and a yoke including a first end coupled to the seat and a second end configured to couple with a central portion of the self-balancing personal transporter, wherein the yoke extends in the same axial direction as the at least one wheel.

14 Claims, 11 Drawing Sheets

SELF-BALANCING STAND-UP TRANSPORTER-DRIVEN TRAILER

CROSS-REFERENCE TO RELATED APPLICATIONS

This application claims the benefit of U.S. Provisional Patent Application No. 62/253,196 filed Nov. 10, 2015, the entirety of which is incorporated herein by reference.

FIELD OF THE INVENTION

The invention relates to trailers and in particular to devices employing a trailer operable to be connected to a self-balancing stand-up transporter.

BACKGROUND

There exist self-balancing stand-up personal transporters, which require the user to stand upright, and to tilt their center of gravity, and to use their toes and heels, to control the motion. The motion is very flexible, going back and forth, and turning on the spot very quickly, with surprising dexterity. Some have two wheels, with an upright staff which the user holds. Some are just two wheels, on which the user balances, and some are a single wheel.

SUMMARY OF THE INVENTION

Self-balancing stand up personal transporters are useful, in that they generally are capable of moving a person faster than walking. Such devices are typically electric battery powered, providing up to about five hours of use between recharging. This enables a journey of about ten miles. However, it still can be surprisingly fatiguing to travel standing up, because although it soon becomes easy and natural, the user is still constantly using muscles. Also, it is possible to fall off these devices when they hit an obstacle, such as a small rock, or a rut, or the side of a door opening. Many of these devices are offered for sale to the public with warning labels which accentuate the dangers, which may include serious injury and death. The user manuals which accompany these devices may even state that when using the device a user is likely to lose control, collide and fall.

There are self-balancing scooters sold under the trade name "Airwheel" which include a seat integral with the device, the seat disposed above the wheel. In one model the seat is directly above the wheel so that a user sits above the wheel. In another model the seat is offset from the top of the wheel but still integral with the device. Because the seat is part of the unit in both models, if the wheels strike an obstacle, causing the device to stop, momentum will cause the user to continue in the direction of travel and fall.

The presently disclosed subject matter significantly reduces these disadvantages. Provided herein are trailers having a seat for a user couplable to a self-balancing transporter. The presently disclosed subject matter may be used in conjunction with commercially available self-balancing transporters such as Segway, Airwheel and Onewheel brand transporter devices.

In accordance with one or more embodiments a trailer is disclosed which is configured to couple to a self-balancing personal transporter, the trailer including a seat, at least one wheel rotatably coupled to the seat and oriented in an axial direction, the seat configured and positioned to support a user in a seated position with the user's feet in contact with a foot rest of the self-balancing personal transporter, and a yoke including a first end coupled to the seat and a second end configured to couple with a central portion of the self-balancing personal transporter, wherein the yoke extends in the same axial direction as the at least one wheel. In some embodiments the central portion of the self-balancing personal transporter is located between two foot rests of the self-balancing personal transporter.

In still further embodiments the trailer includes at least two wheels.

The yoke may include a coupling element which is removably couplable to the self-balancing transporter. The yoke may in some embodiments be removably coupled to the trailer.

In accordance with still further embodiments, a trailer is disclosed which is configured to couple to a self-balancing personal transporter, the trailer including a support, at least one wheel rotatably coupled to the support and oriented in an axial direction, a seat positioned on the support, the seat configured and positioned to support a user in a seated position with the user's feet in contact with a foot rest of the self-balancing personal transporter, and a tie bar including a first end coupled to the support and a second end pivotably coupled with a yoke, wherein the yoke is configured to couple with a central portion of the self-balancing personal transporter, wherein the tie bar extends in the same axial direction as the at least one wheel.

In some embodiments the yoke includes a post extending therefrom and the tie bar includes an opening for receiving and engaging the post. The tie bar may be removably coupled to the trailer.

In yet further embodiments, a trailer is disclosed which is configured to couple to a self-balancing personal transporter, the trailer including a support, at least one wheel rotatably coupled to the support and oriented in an axial direction, a seat positioned on the support, the seat configured and positioned to support a user in a seated position with the user's feet in contact with at a yoke, a tie bar including a first end coupled to the support and a second end coupled with the yoke, wherein the yoke includes at least one foot rest and is configured to couple with a central portion of the self-balancing personal transporter, wherein the tie bar extends in the same axial direction as the at least one wheel.

In some embodiments the yoke includes a generally U-shaped section including a first wall having a first side positioned between and connecting opposing walls at respective first ends of the opposing walls, wherein the first side of the first wall faces the generally U-shape formed by the opposing walls, wherein the opposing walls of the generally U-shaped section are configured to fit around and accommodate a wheel of the self-balancing transporter, wherein the self-balancing transporter includes at least one wheel rotatably disposed in an aperture formed in a central region of a footboard, wherein each of the opposing walls of the yoke further comprise a longitudinal groove sized and configured to engage edges of the footboard of the self-balancing transporter. The yoke may include a foot rest extending outward from each of the opposing walls. In still further embodiments, the trailer further includes a control stem extending from a second, opposite side of the first wall of the yoke, wherein the stem is coupled to the tie bar. The stem may be coupled to the tie bar via a swivel coupling.

In further embodiments, the trailer according to any of the foregoing embodiments may be provided as a kit with one or more foot rest adapters configured to engage a footboard of the self-balancing personal transporter. Foot rest adapters as disclosed herein may include a first side configured to contact a footboard surface, a coupling element configured to releasably engage the footboard surface, and a second, opposite side configured to contact the foot of a user. The foot rest adapters disclosed herein may for example include a wedge-shaped cross-section such that an angle is formed between the first side and the second side.

In still yet further embodiments, a kit is provided for adapting a self-balancing personal transporter to a seated conveyance, permitting a seated user to operate the self-balancing personal transporter, the kit including a trailer configured to couple to a self-balancing personal transporter, the trailer including a support, at least one wheel rotatably coupled to the support and oriented in an axial direction, a seat positioned on the support, the seat configured and positioned to support a user in a seated position with the user's feet in contact with a foot rest of the self-balancing personal transporter, and a tie bar comprising a first end coupled to the support and a second end pivotably coupled with a yoke, wherein the yoke is configured to couple with a central portion of the self-balancing personal transporter, wherein the tie bar extends in the same axial direction as the at least one wheel; and a pair of foot rest adapters configured to engage a footboard of the self-balancing personal transporter.

BRIEF DESCRIPTION OF THE DRAWINGS

For the purposes of illustration, there are forms shown in the drawings that are presently preferred, it being understood, however, that the invention is not limited to the precise arrangements and instrumentalities shown.

DETAILED DESCRIPTION OF THE INVENTION

Figure 1:
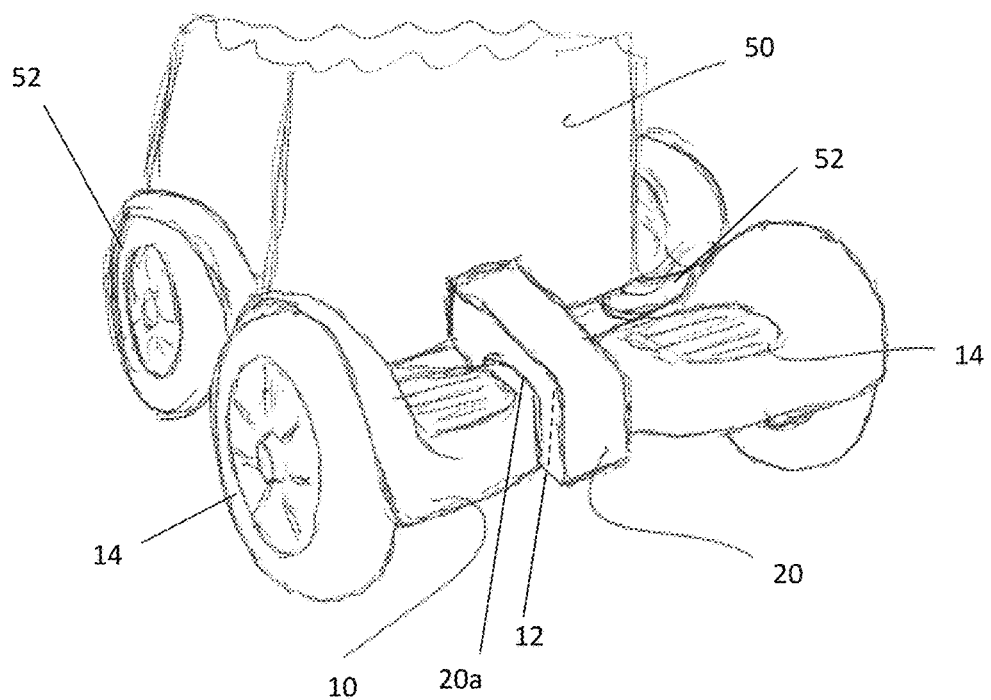
FIG. 1 is a front perspective view of a self-balancing transporter connected to a trailer in accordance with one or more embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Although the devices and systems of the present disclosure have been described with reference to exemplary embodiments thereof, the present disclosure is not limited thereby. Indeed, the exemplary embodiments are implementations of the disclosed systems and methods are provided for illustrative and non-limitative purposes. Changes, modifications, enhancements and/or refinements to the disclosed systems and methods may be made without departing from the spirit or scope of the present disclosure. Accordingly, such changes, modifications, enhancements and/or refinements are encompassed within the scope of the present invention.

Figure 2:
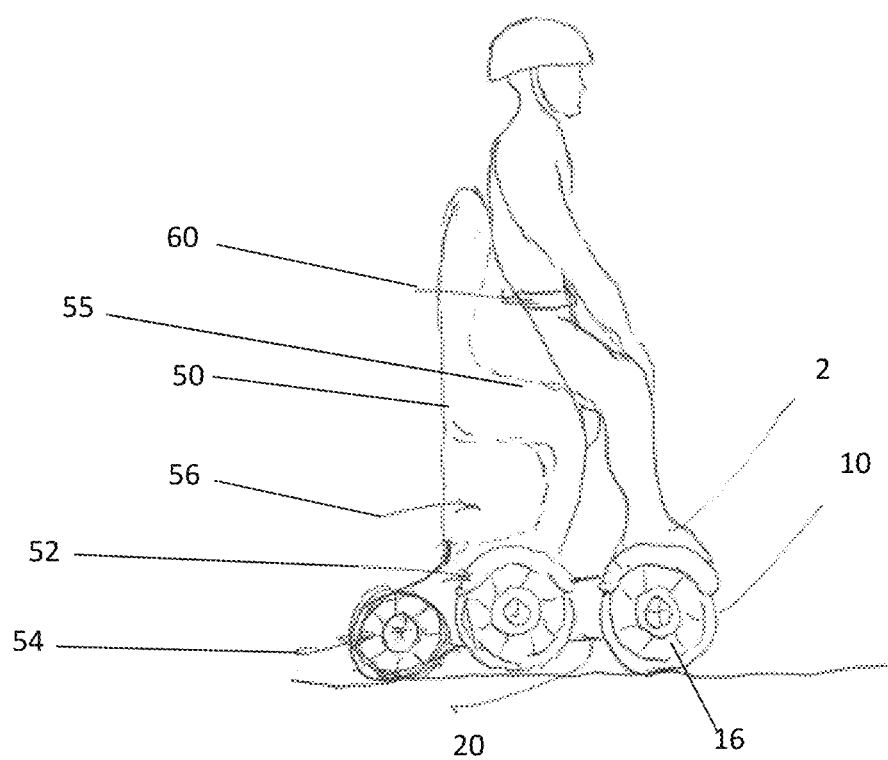
FIG. 2 is a side view of a self-balancing transporter connected to a trailer in accordance with one or more embodiments of the present invention.

Now referring to FIGS. 1 and 2, in accordance with some embodiments, a trailer 50 with seat 55 includes a yoke 20 coupled to the trailer 50 and wheels 52. The yoke 20 is configured to engage a central portion 12 between foot rests 14 of a prior art self-balancing transporter 10. Some embodiments the yoke 20 includes a coupling element 20a which is removably couplable to the self-balancing transporter 10.

The trailer 50 may be or include a seat 55 with one or more wheels 52 mounted thereto with the yoke 20 extending from a front end of the seat 55. In other embodiments the trailer 50 may include support features to which the seat 55 and one or more wheels are mounted.

The yoke 20 may be permanently or removably fixed at one end to the trailer 50. The coupling element 20a may be any suitable coupling means sized and configured to connecting couple the trailer 50 to the self-balancing transporter 10 such as a U-shaped recess as shown, a bracket, hook, etc. so that it is adaptable to various designs of self-balancing transporters and any design of self-transporter which comes about.

The self-balancing transporter 10 is used as a power source to pull the trailer 50. When commencing a journey, the trailer 50 is connected to the self-balancing transporter 10. A user 2 sits in or on the trailer 50, and controls motion with his or her feet positioned on the foot rests 14 using the self-balancing transporter 10. Although the user 2 is seated, the user 2 still controls the forward and backward movement, speed, and the turning, by foot. This requires that a certain minimum force be applied to the transporter 10, and that there is freedom for the transporter 10 to turn.

At any time, the self-balancing transporter 10 can be disconnected from the trailer 50 and used in an upright standing position.

The seat 55 may be positioned in any suitable location on the trailer 50 to enable the user 2 to exert sufficient force and movement to operate the self-balancing transporter 10. The seat 55 is optimally positioned and dimensioned to withstand tipping, by distributing its weight so that its center of gravity is low. The seat 55 may be adjustable to provide a user 2 the ability to vary the degree of uprightness relative to the ground surface. In one or more embodiments the seat 55 is inclined since this ergonomic position enables some of the weight of the user 2 to be also supported by their feet. Application of force by the feet of the user 2 is necessary to control the self-balancing transporter and the inclined position provides easy application of such force.

The trailer 50 may include arm rests as well as other features typically found in chairs and seats.

The trailer 50 with a seat 55 separates the user from full support dependence on the transporter. This separation causes a substantial increase in safety over the use of the self-balancing transporter 10 by itself. The trailer 50 may further include a restraint 60 such as a seat belt and/or restraining bar, which serve to keep the user 2 from falling out of the seat 55. Because the trailer 50 is not integral with the self-balancing transporter 10, should the self-balancing transporter 10 strike an obstruction, such as a rock, curb, bump, or the like, the effect of the obstruction is not transferred to the trailer 50. This arrangement, combined with the safety features of the trailer 50, protects the user 2 from a fall or resultant injury.

The trailer may include one or more auxiliary wheels 54 and a storage compartment 56.

In one embodiment the storage compartment 56 sized and configured to accommodate the self-balancing transporter 10. The trailer 50 may include plural storage compartments 56.

Figure 3:
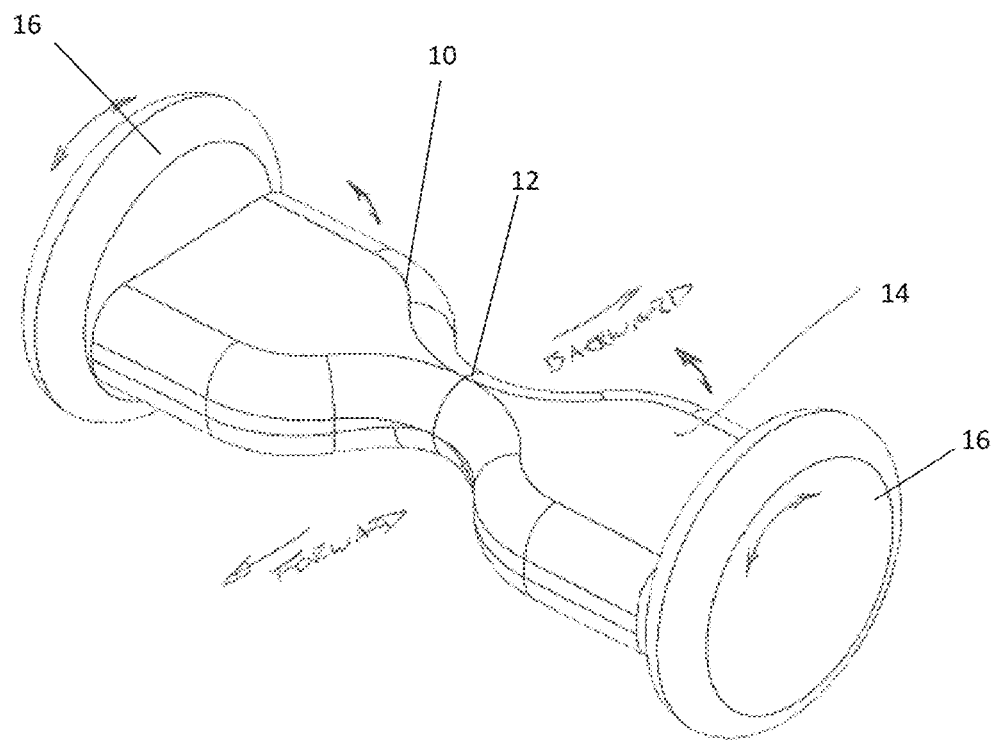
FIG. 3 is an elevated perspective view of a prior art self-balancing transporter.
Figure 4:
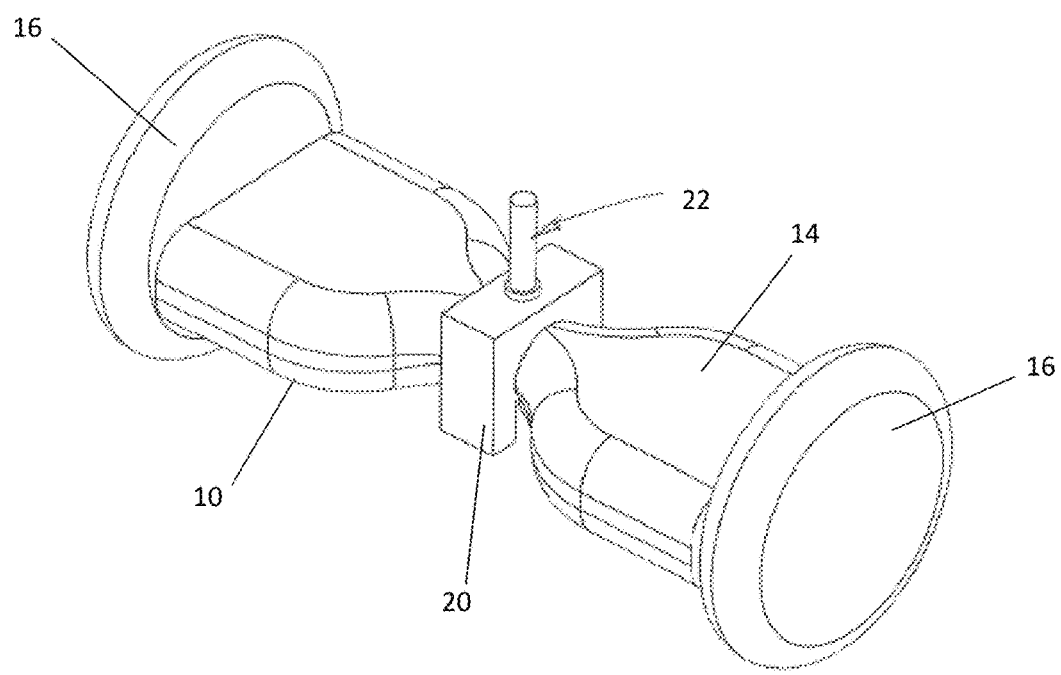
FIG. 4 is an elevated perspective view of a self-balancing transporter with a pivot pin extending therefrom in accordance with one or more embodiments of the present invention.
Figure 5:
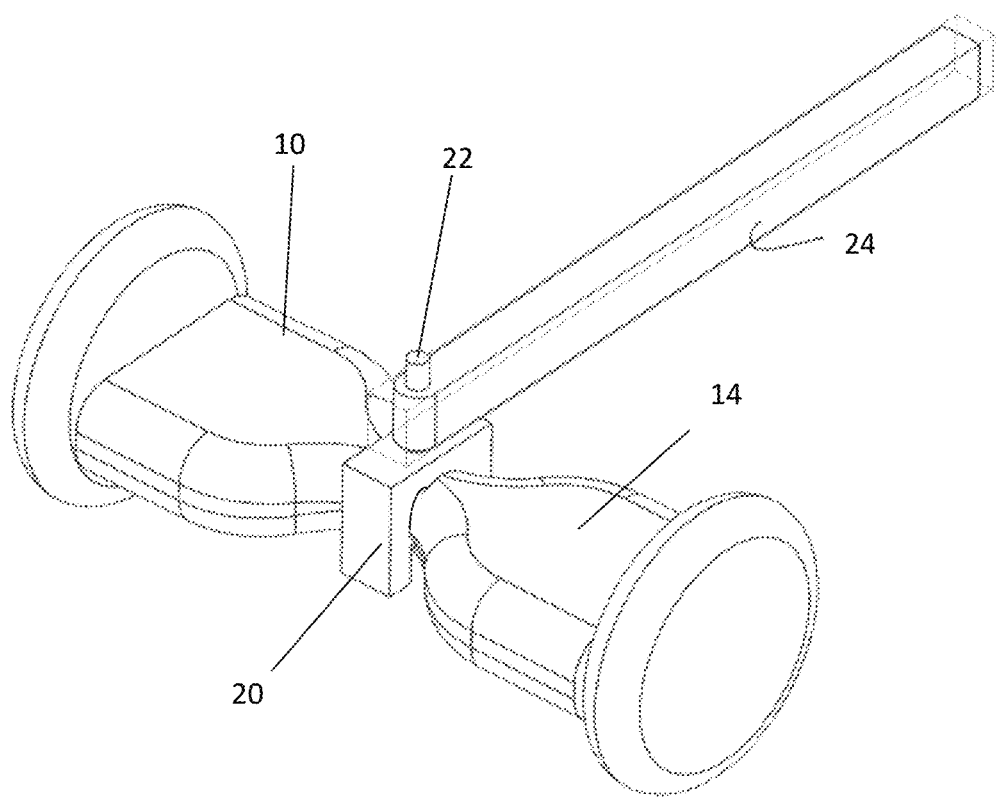
FIG. 5 is an elevated perspective view of a self-balancing transporter with a connector coupled to a pivot pin in accordance with one or more embodiments of the present invention.
Figure 6:
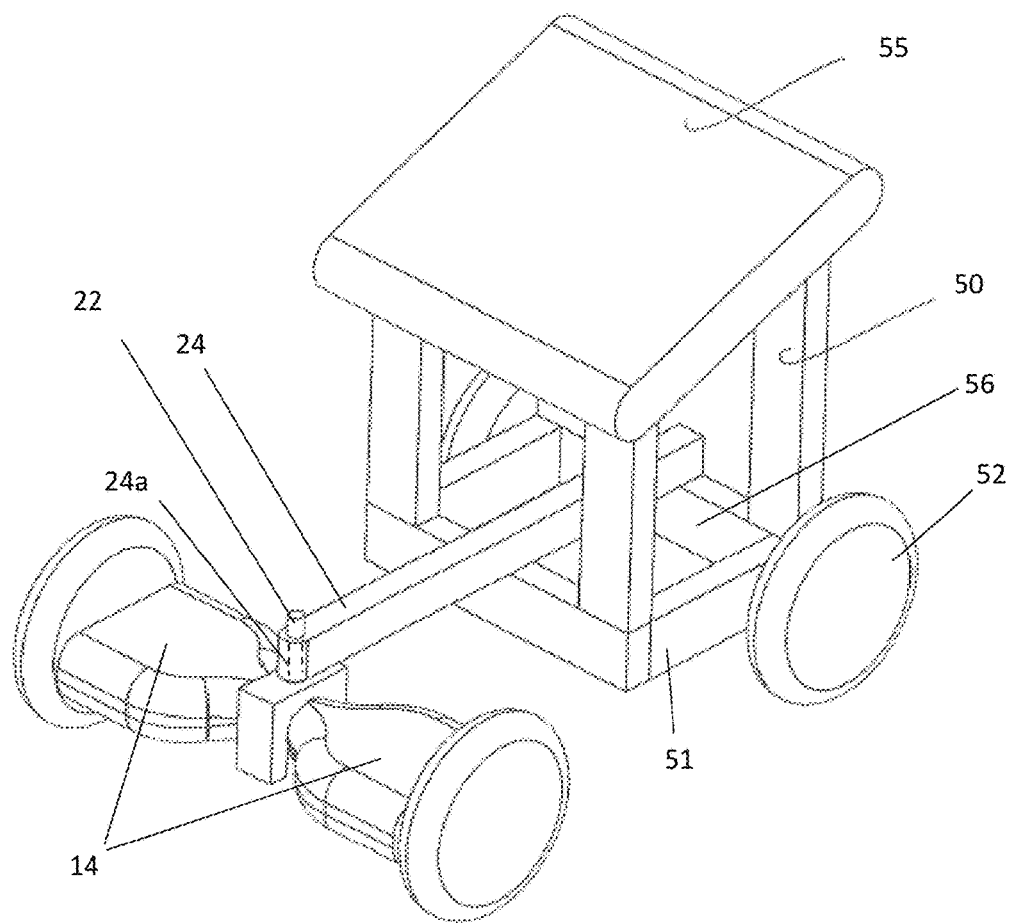
FIG. 6 is a perspective view of a self-balancing transporter coupled to a trailer with a seat in accordance with one or more embodiments of the present invention.

With reference to FIG. 3, a typical self-balancing transporter 10 is shown. With further reference to FIGS. 4-6, in one embodiment, a yoke 20 includes a post 22 extending from a top surface thereof configured to pivotably couple a tie bar 24 to trailer 50 via aperture 24a. A retaining pin, not shown, may be employed to secure the tie bar 24 to post 22. In such embodiments the post 22 includes an aperture at an end distal from yoke 20 to receive the pin. Other releasable retaining means well known in the art may be employed. The pivotable coupling is adapted to the local shape of the self-balancing transporter. The trailer 50 may include a support 51 to which the wheels 52 and seat 55 are mounted.

The tie bar 24 which is operable to removably couple the trailer 50 to the self-balancing transporter 10 may take various forms. The tie bar 24 may for example be integral with the yoke 20. For example, the tie bar 24 may include a hook as a yoke 20 to engage the self-balancing transporter 10 at one end, and another coupling means at the opposite end to couple the trailer 50. Suitable coupling devices operable to couple the trailer 50 and the tie bar 24 may include but are not limited to an opening formed in the tie bar 24 to accommodate a bolt, pin, etc.; a bracket and pin arrangement; clamps, screws, bands, and/or any other coupling devices known to those skilled in the art. As shown in FIG. 5, in one embodiment the tie bar 24 is fixed to trailer 50.

The tie bar 24 may include or be one or more shock-absorbing elements to absorb a sudden stop of the transporter 10, without transferring this sudden stop to the trailer. Any suitable shock absorbing element may be employed, including a gas- or spring-loaded shock absorber, etc. The tie bar 24 desirably has horizontally rigidity adequate to impart a sharing weight force to the top of the transporter 10. Most, if not all, self-balancing transporters require a minimum downward force be applied in order for the device to operate. The tie bar 24 helps the weight of the user 2 and trailer 50 apply a downward force on the self-balancing transporter 10 adequate to ensure the self-balancing transporter 10 will operate. The tie bar 24 thus provides a reasonable deceleration, which does not cause abrupt forces to be transferred to the user 2.

Figure 7:
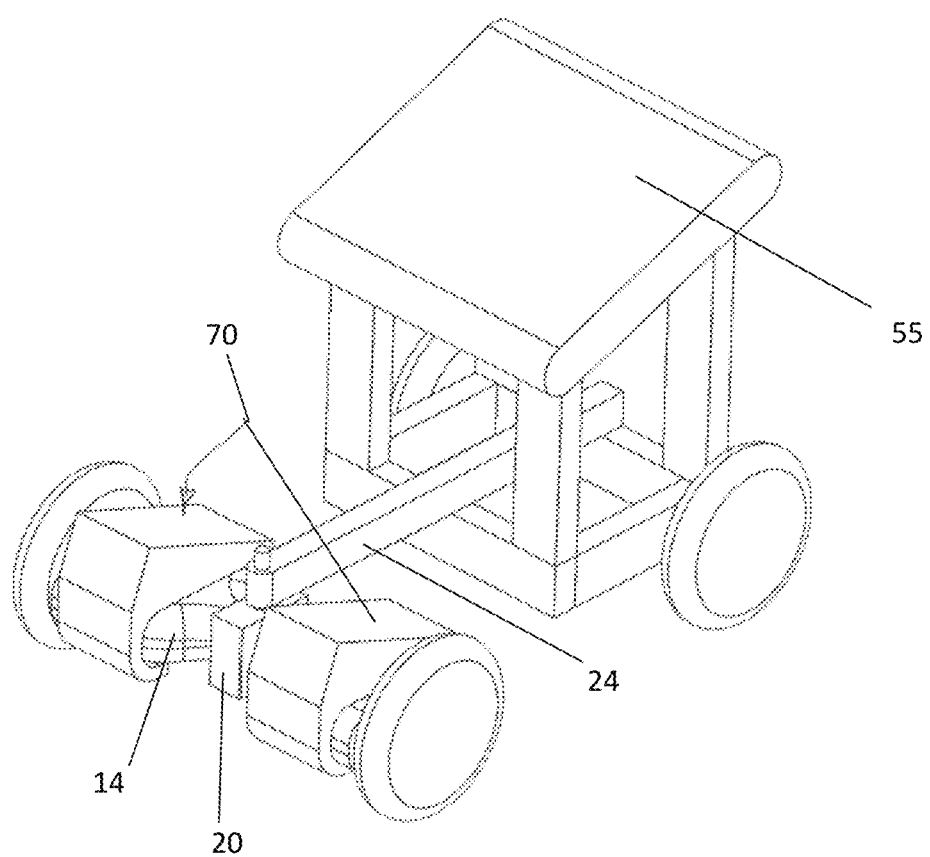
FIG. 7 is a perspective view of a self-balancing transporter coupled to a trailer and foot adapters operable to change the angle of control for a user in accordance with one or more embodiments of the present invention.

Now referring to FIG. 7, in some cases, since users come in different sizes, strengths and degrees of coordination, in some embodiments foot rest adapters 70 are provided to adapt the position of the feet of the user 2 relative to the self-balancing transporter 10. The foot rest adapters 70 are configured to be coupled to the footrests 14 of the self-balancing transporter 10 and have an exterior profile operable to transmit leverage from feet of a user 2 to the footrests 14 to allow the foot to operate the self-balancing transporter 10 comfortably and naturally. For example, the foot rest adapter 70 may include a wedge-shaped cross-section such that an angle is formed between a first, footboard-contacting side and an opposite, foot-contacting side, to create an ergonomic position from which leverage can be easily applied by a user 2. The foot rest adapters 70 may include hooked ends as shown to engage the foot board 14 of the self-balancing transporter 10. The trailer 50 may provided with at least one of and preferably a pair of foot rest adapters 70 as a kit.

Figure 8:
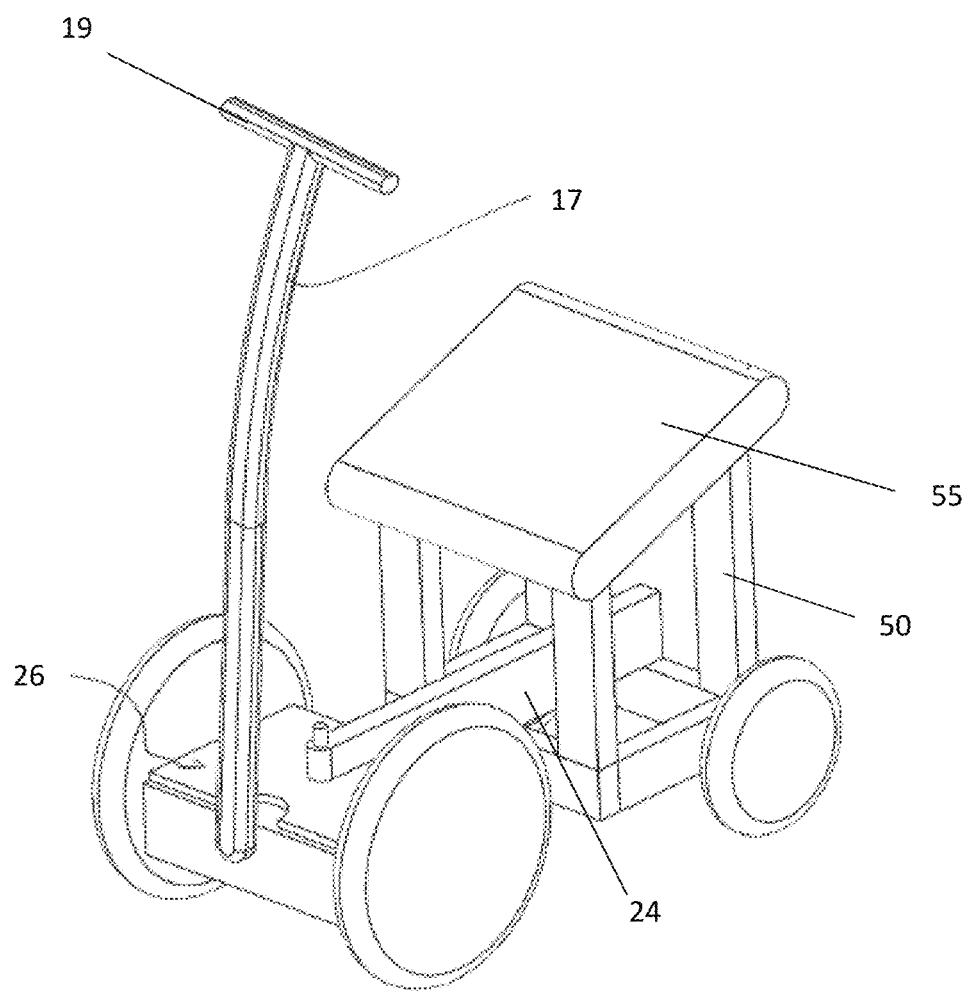
FIG. 8 is a perspective view of a self-balancing transporter with a stem hand-controller coupled to a trailer with a seat in accordance with one or more embodiments of the present invention.

The subject matter disclosed herein is operable to be used with any commercially available self-balancing transporter. For example, with reference to FIG. 8, a trailer 50 and tie bar 24 is coupled to a stem controlled self-balancing transporter 10. Stem-controlled transporters rely on hand movement rather than foot movement. In accordance with one embodiment, a trailer 50 is configured to couple to a self-balancing transporter 10 such as an Airwheel brand self-balancing transporter with stem control (such as for example Airwheel Models S3, S5, S3T, etc.), wherein the orientation of the stem 17 and handle 19 is reversed so that the handle 19 is within comfortable reach of the user 2 when the trailer 50 is coupled thereto. The tie bar 24 is coupled to a foot plate 26 which in turn is coupled to the transporter 10. In cases in which a display (for trip information, etc.) is incorporated into the handle 19, as is the case with at least some Airwheel brand devices, the orientation of the display is adjusted relative to the handle 19 so it is facing the user.

Figure 9:
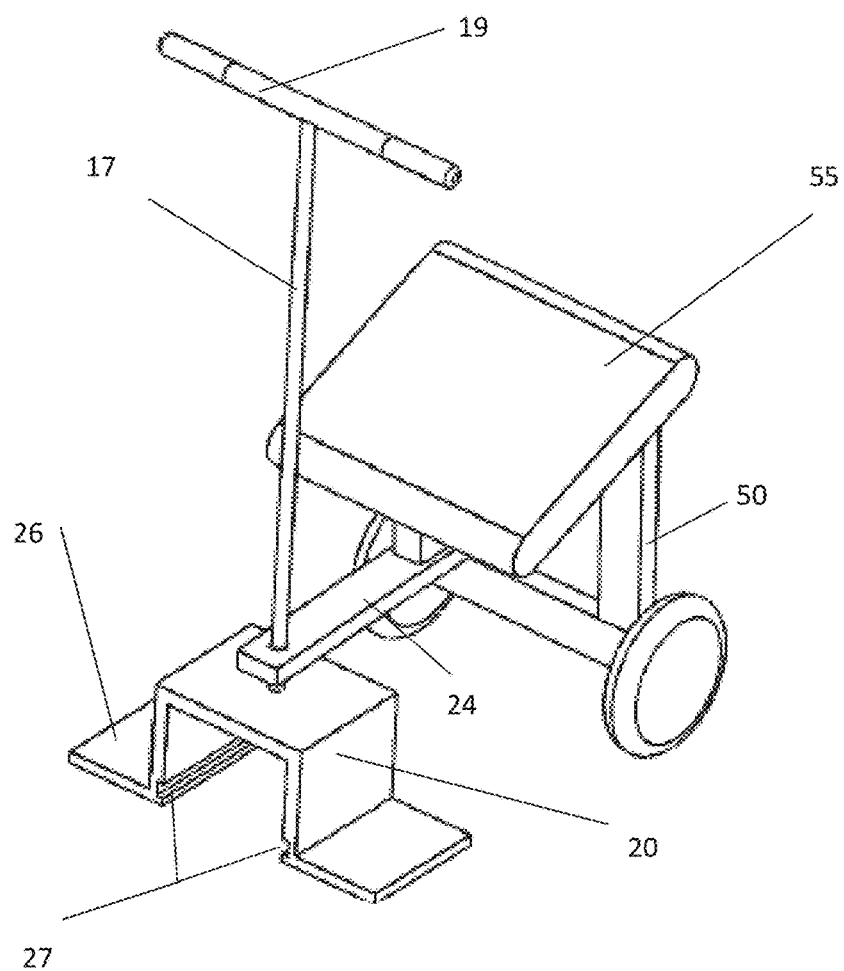
FIG. 9 is a perspective view of a trailer with a seat in accordance with one or more embodiments of the present invention.
Figure 9A:
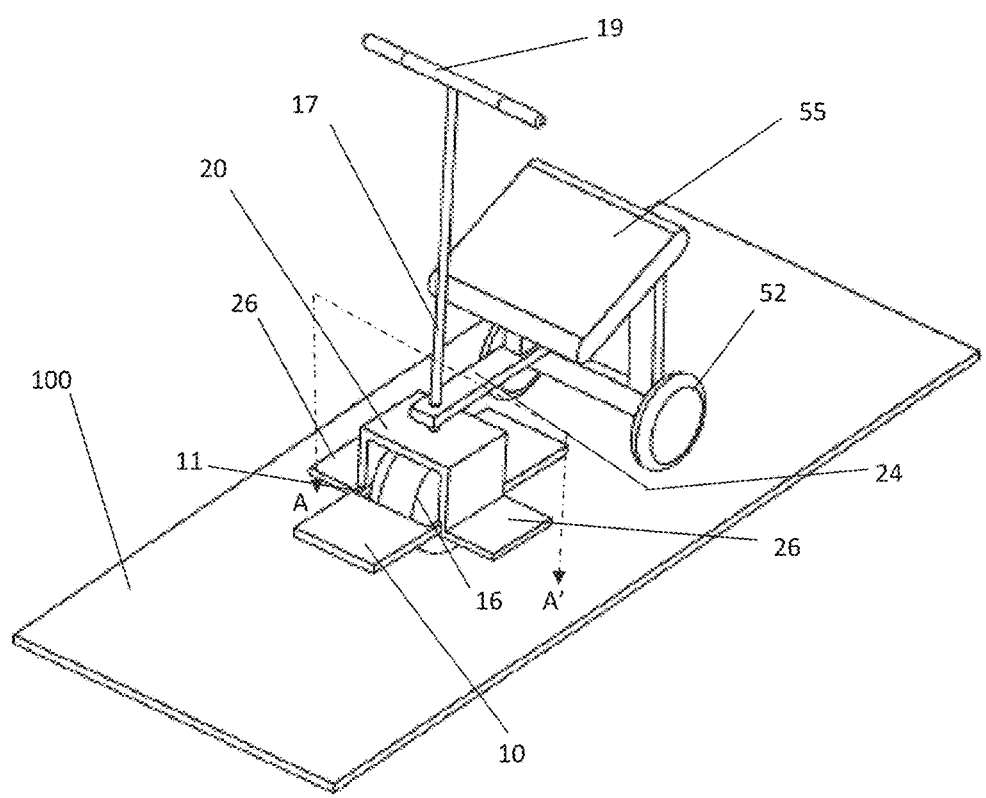
FIG. 9A is a perspective view of the trailer of FIG. 9 operably coupled to a self- balancing transporter in accordance with one or more embodiments of the present invention.
Figure 9B:
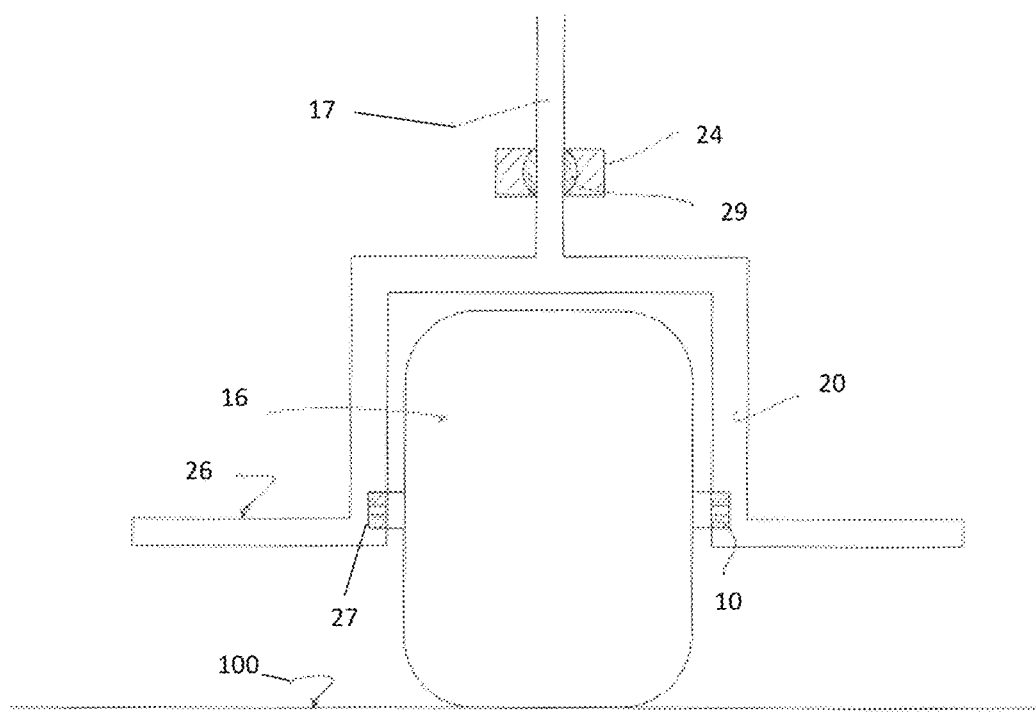
FIG. 9B is a cross-sectional view of the apparatus of FIG. 9A taken along line A-A' in accordance with one or more embodiments of the present invention.

Now referring to FIGS. 9-9B, in a further embodiment a trailer 50 is shown configured and operable to be coupled to a Onewheel brand self-balancing transporter 10, the trailer 50 including one or more wheels 52, seat 55, yoke 20 which includes foot rests 26, tie bar 24, control stem 17, handle 19 and grooves 27 for engaging frame 11 of self-balancing transporter 10. Tie bar 24 is coupled with control stem 17 via swivel coupling 29. Yoke 20 is sized and configured to accommodate the wheel 16 of the self-balancing transporter 10. The Onewheel brand self-balancing transporter does not necessarily require a downward force applied to it to operate. Therefore a user 2 can turn the self-balancing transporter 10 using the control stem 19. For example, moving the control stem 19 left will cause the yoke 20 to lean, and thus turn, left. The user 2 can place their feet in any desired position since foot pressure is not required. A user 2 can also initiate turns using foot pressure applied to the foot rests 26.

Various embodiments the trailer 50 may include additional features, such as but not limited to a canopy, windshield, windshield wipers, and the like to facilitate usage in various types of weather.

In various embodiments the trailer 50 may include, in lieu of or in addition to wheels 52, or more ground-contacting elements. For example, the ground-contacting element(s) may be any suitable wheel including but not limited to solid wheels, pneumatic tires, and the like, skis, skids, skates, casters, glides, air (such as in hovercraft), etc.. The number and dimensions of the ground-contacting elements may be adequate to provide independent stability to the trailer 50. In other embodiments the number and dimensions of the ground-contacting elements may be adequate only to provide stability when the trailer 50 is coupled to the self-balancing transporter 10.

There are a number of possible designs for the trailer 50. Some examples include a two wheeled hand truck arranged horizontally, on which a chair is attached; a single wheeled rear of a bicycle; a single wheeled rear of a motor scooter such as a Vesper (without the engine); an office chair with swivel casters; a plant stand with swivel casters (being very low, the user can't fall very far); a two wheeled garden cart, with a chair attached; a two wheeled trailer, such as a child-towing bicycle trailer; an industrial four wheeled hand truck, with a chair attached; a pair of skis with a seat, for traveling over snow; a floating air cushioned hovercraft, with a seat; any efficient rolling, sliding or air cushion floating contrivance with a place for a sitting user. The yoke 20 and tie bar 24 may be adapted to connect to any such trailers 50 such as by providing a coupling at an end of the tie bar 24 opposite the end of the tie bar 24 coupled to the transporter 10. Suitable couplings may include but are not limited to an opening formed in the tie bar 24 to accommodate a bolt, pin, etc.; a bracket and pin arrangement, etc. and/or any other coupling devices known to those skilled in the art.

Trailers 50 as disclosed herein which may employ a seat-belted place to safely ride, when coupled to a towing, self-balancing personal transporter 10, provide for safer road, side walk, and cross country travel than a self-balancing transporter provides in a stand-up mode. Devices disclosed herein also providing the flexibility of using the self-balancing transporter, without the trailer, (it can be parked and locked like a bicycle). As well as being safer, the presently disclosed subject matter makes the journey less fatiguing. It also provides an easy way to carry the transporter. For example, if the transporter battery should discharge, the transporter 10 can be stored in a storage compartment 56 while pushing or pulling the trailer 50 to a power source.

Although the devices and systems of the present disclosure have been described with reference to exemplary embodiments thereof, the present disclosure is not limited thereby. Indeed, the exemplary embodiments are implementations of the disclosed systems and methods are provided for illustrative and non-limitative purposes. Changes, modifications, enhancements and/or refinements to the disclosed systems and methods may be made without departing from the spirit or scope of the present disclosure. Accordingly, such changes, modifications, enhancements and/or refinements are encompassed within the scope of the present invention.

What is claimed is:

1. A trailer configured to couple to a self-balancing personal transporter, the trailer comprising a seat, at least one wheel rotatably coupled to the seat and oriented in an axial direction, the seat configured and positioned to support a user in a seated position with the user's feet in contact with a foot rest of the self-balancing personal transporter, and a yoke comprising a first end coupled to the seat and a second end configured to couple with a central portion of the self-balancing personal transporter, wherein the yoke extends in the same axial direction as the at least one wheel.

2. The trailer of claim 1 wherein the central portion of the self-balancing personal transporter is located between two foot rests of the self-balancing personal transporter.

3. The trailer of claim 1 comprising at least two wheels.

4. The trailer of claim 1 wherein the yoke comprises a coupling element which is removably couplable to the self-balancing transporter.

5. The trailer of claim 1 wherein the yoke is removably coupled to the trailer.

6. A trailer configured to couple to a self-balancing personal transporter, the trailer comprising a support, at least one wheel rotatably coupled to the support and oriented in an axial direction, a seat positioned on the support, the seat configured and positioned to support a user in a seated position with the user's feet in contact with a foot rest of the self-balancing personal transporter, and a tie bar comprising a first end coupled to the support and a second end pivotably coupled with a yoke, wherein the yoke is configured to couple with a central portion of the self-balancing personal transporter, wherein the tie bar extends in the same axial direction as the at least one wheel.

7. The trailer of claim 6 wherein the central portion of the self-balancing personal transporter is located between two foot rests of the self-balancing personal transporter.

8. The trailer of claim 6 comprising at least two wheels.

9. The trailer of claim 6 wherein the yoke comprises a coupling element which is removably couplable to the self-balancing transporter.

10. The trailer of claim 6 wherein the yoke comprises a post extending therefrom and the tie bar comprises an opening for receiving and engaging the post.

11. The trailer of claim 6 wherein the tie bar is removably coupled to the trailer.

12. A kit for adapting a self-balancing personal transporter to a seated conveyance, permitting a seated user to operate the self-balancing personal transporter, the kit comprising a trailer configured to couple to a self-balancing personal transporter, the trailer comprising a support, at least one wheel rotatably coupled to the support and oriented in an axial direction, a seat positioned on the support, the seat configured and positioned to support a user in a seated position with the user's feet in contact with a foot rest of the self-balancing personal transporter, and a tie bar comprising a first end coupled to the support and a second end pivotably coupled with a yoke, wherein the yoke is configured to couple with a central portion of the self-balancing personal transporter, wherein the tie bar extends in the same axial direction as the at least one wheel; and a pair of foot rest adapters configured to engage a footboard of the self-balancing personal transporter.

13. The kit of claim 12 wherein each of the foot rest adapters has a first side configured to contact a footboard surface, a coupling element configured to releasably engage the footboard surface, and s second, opposite side configured to contact the foot of a user.

14. The kit of claim 13 wherein at least one of the foot rest adapters comprises a wedge-shaped cross-section such that an angle is formed between the first side and the second side.

\* \* \* \* \*